No. 654,578. Patented July 24, 1900.
G. H. ABRAMS.
REFRIGERATING APPARATUS.
(Application filed June 27, 1896.)
(No Model.)
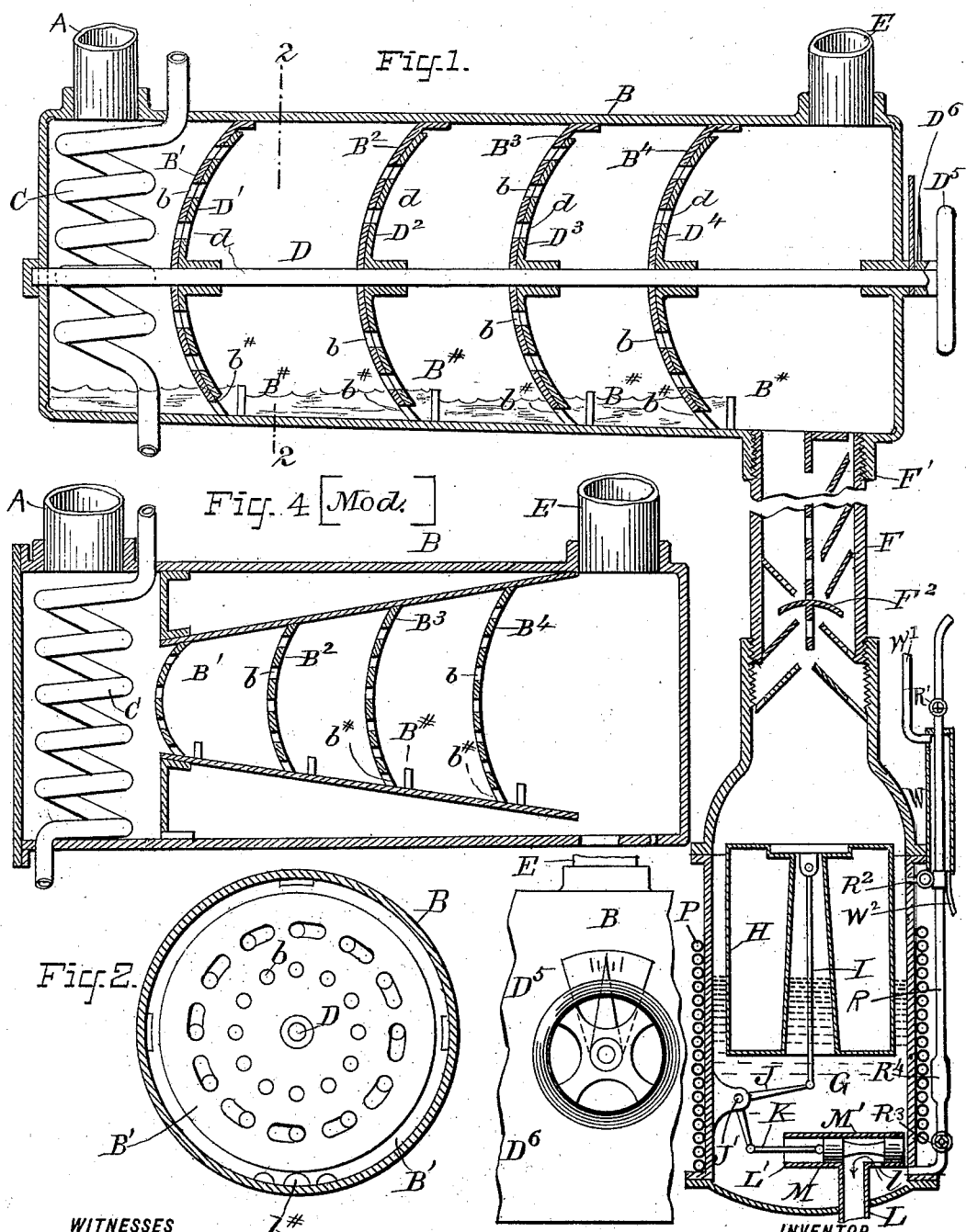

UNITED STATES PATENT OFFICE.

GEORGE H. ABRAMS, OF NEW YORK, N. Y.

REFRIGERATING APPARATUS.

SPECIFICATION forming part of Letters Patent No. 654,578, dated July 24, 1900.

Application filed June 27, 1896. Serial No. 597,167. (No model.)

*To all whom it may concern:*

Be it known that I, GEORGE H. ABRAMS, a citizen of the United States, residing in New York, (Brooklyn,) Kings county, in the State of New York, have invented a certain new and useful Improvement in Refrigerating Apparatus, of which the following is a specification.

The improvement is intended more especially for that class of refrigerating apparatus in which air is alternately compressed and expanded, and I will describe it as thus applied. The intent is to separate the excess of water which is found when air is received under ordinary atmospheric conditions. I provide also for the opposite conditions, where the air is worked over many times and may become too dry. I provide for introducing into the compressor a small quantity of water with sufficient compressed air to aid its injection and distribution. The effect is to reduce the quantity of moisture in the air to a certain low limit and retain it there. I provide for warming certain parts to prevent the arrest of the operation by freezing under any conditions.

The accompanying drawings form a part of this specification, and represent what I consider the best means of carrying out the invention.

Figure 1 is a vertical section in the plane of the axis of the separator and trap. Fig. 2 is a cross-section of the separator on the line 2 2 in Fig. 1. Fig. 3 is an end view of the adjusting means. Fig. 4 shows a modification. It is a longitudinal section through the separation in the line of the axis.

The drawings show the novel parts, and their relations to the other parts will be readily understood from the description.

Similar letters of reference indicate corresponding parts in all the figures where they appear.

I effect the separating of the moisture from the air by causing it to traverse successively through the apertures in a series of perforated disks, making the disks preferably doming to contribute strength, and I provide for varying the areas of the apertures to allow of correspondingly modifying the efficiency of the apparatus in varying conditions of atmosphere.

My trap is adapted to serve with any pressure of the compressed air and the parts being perfectly balanced, but I will describe it as working with the ordinary tension of about one hundred and fifty pounds per square inch. The air, which it will be understood has been compressed by an ordinary compressing-pump, (not shown,) has been passed through any requred number of pipes or vessels in which it has been cooled by a liberal application of cold water or other cooling agency, (it may be cold air,) so that it is nearly down to ordinary temperature. A is the pipe through which this air is received into the separator.

B is a stout cylindrical vessel, and B' B² B³ B⁴ are partitions which are dished or domed, as shown, to increase their stiffness and are liberally perforated with small apertures $b$.

C is a coil of pipe through which cold water or other cooling agency is circulated to still further lower the temperature of the air.

D is a shaft mounted in bearings in the ends of the vessel B. On the shaft D adjacent to the several disks B', B², &c., are correspondingly-domed disks D' D² D³ D⁴. These disks are perforated each to correspond to the perforations in its associated stationary disk; but the exterior series of perforations are elongated circumferentially. (See Fig. 2.) The shaft D, with its attached disks, can be partially rotated by means of a hand-wheel D⁵. The shaft is provided with an index D⁶, which traverses over a graduated scale on the exterior of the vessel B.

Besides the perforations $b$ in the main body of each disk B', &c., with the provisions by the movable disks D', &c., for closing or partially closing them, I provide notches $b\sharp$ in the lower edge of each disk B' B², &c., which remain always open, because the corresponding disk D' D², &c., is not of sufficient diameter to cover them, however much of it may be turned. Partial partitions or ridges B$\sharp$ in the bottom of the vessel B, arranged, as shown, near the notches $b\sharp$, serve to retain a sufficient quantity of water in the bottom of the separator to prevent the passage of air and to allow only the passage of water through the notches $b\sharp$. This follows from the fact that the ridges B$\sharp$ serve as dams to raise the level of the water, so as to entirely immerse the notches.

When in action, the apparatus receives a strong flow of compressed air liberally sprinkled with water through the pipe A, and it is further cooled by its contact with the cold pipe C. Such air moves through the perforations in the several partitions B' D' B² D² with more or less freedom, according as the shaft D and the connected disks are turned by the hand-wheel D⁵. The perforations are so arranged that while the air can move through the apparatus with tolerable freedom by changing its direction many times to find its way through the several holes in the several disks the particles of water being more dense are certain to impinge against the disks D' and be arrested and trickle down. The liberal passage provided by the notches $b\sharp$ at the bottom allow the water to flow along the bottom without accumulating in excess; but the fact that the notches are completely immersed or "drowned" prevents the passage of the air through this portion of the apparatus. If there is but little water to be separated—as, for example, when air has been treated many times in the apparatus and has attained about the hydrometric conditions desired—the shaft D may be turned so as to leave the apertures $b\ d$ matching exactly, and consequently giving a very liberal passage for the air; but when different conditions obtain, eminently when further fresh air is taken in, which when compressed and cooled contains a large surplus of moisture, it is important to adjust the apparatus so that the passage through the several apertures shall be gently but sufficiently restrained. The vigor with which the air is compelled to change its course when thus restrained is increased, and thus the separating effect—the tendency to separate the particles of water by projecting them against the several disks—is increased without requiring such further great restraint on the air as to cause it to blow through the drowned notches $b\sharp$ below. After the main portions of the watery particles have been thus precipitated upon the surfaces and induced to descend to the bottom, the air thus efficiently dried is allowed to flow upward through the passage E, which leads it to the engine, in which it is to be allowed to expand. The water in the bottom of the vessel B moves along in the direction of the current so soon as it has accumulated sufficiently to flow over the several partitions B$\sharp$ and on arriving at the delivery end of the vessel B is allowed to fall through the liberal pipe F and ultimately gathers in the trap G at a considerably-lower level. The passage F is provided with deflectors F' F², &c., which allow the water to descend, but arrest the agitation of the air, so that it is practically quiet in and about the trap. These surfaces also further effect the arresting of the particles of water and the liberation of the air which may be associated.

The trap G is peculiarly equipped. The float H connects by a link I with a bell-crank lever J, turning on a fixed center J', the lower arm of which lever connects by a link K with a piston M, which is a double piston, the two parts being held at a distance apart by means of a stem M' of less diameter. This double piston receives an exactly-equal pressure on each of the end faces, so that it is entirely unaffected by the high and sometimes variable pressure which obtains in the apparatus. It is adapted to travel lightly and easily in a nicely-bored horizontal cylinder L', which communicates at its mid-length with a pipe L, leading downward and away. The horizontal cylinder L' is provided with one or more apertures $l$, arranged as shown. When by reason of an accumulation of water in the trap the float H rises and changes the position of the lever J, it shifts the double piston M to the right and uncovers the aperture $l$, thus allowing the water to flow inward and downward and escape. In practice the double piston M will rarely move so far to the right as to entirely uncover the apertures $l$. A very little opening of these apertures will usually suffice. It will be observed that on passing these apertures the water is suddenly relieved from pressure. There is often a modicum of air in the water due to the conditions under which it is collected and the presence of a greater or less quantity of lubricating material from the compressor in a state of foam or emulsion. Such air will on being relieved from pressure expand and induce intense cold. I provide for warming the trap by enveloping it in a jacket of steam. This is preferably in the form of a coil P, which it will be understood is connected with a steam-boiler. (Not represented.)

By reason of the horizontal position of my valve M the two portions of equal area are certain to be exactly balanced by the pressure of the water thereon, differing in this respect from the ordinary upright valves, in which the pressure in the lower valve is obviously the greatest.

R is a pipe connecting with the interior of the trap near the bottom and leading upward to the compressor. (Not shown.) This pipe may be small. The flow through it is controlled by a stop-cock R', so that the small quantity of water, more or less mingled with air, which is allowed to flow upward through this pipe into the compressor may be modified at will. R² is a cock in a short branch which connects the upper part of the trap with an adjacent portion of this pipe R. R³ is a cock which controls the main flow from the bottom of the trap. By partially closing one or the other of these cocks the relative proportions of air and water which is delivered through the partially-opened cock R' may be varied.

R⁴ is an automatic check-valve, the function of which is simply to prevent the return of the water after it has flowed upward.

The apparatus insures that a small and controllable quantity of water shall be led up to the compressor with a sufficient quantity of air under a high pressure to insure its efficient injection into that important portion of the apparatus.

It may be important to provide under some conditions means for guarding against the cold due to the expansion of the air as the small quantity escapes from the upper part of the trap to the under side of the compressor. W is a jacket around a short length of the pipe R adjacent to the cock R², and W' and W² are pipes which communicate therefrom to the steam-passages. (Not shown.) The exhaust-steam enters the jacket W through the pipe W' and keeps it filled with steam at atmospheric pressure, and any water condensed therein is free to flow away through the pipe W². These provisions insure ample protection against the freezing of the apparatus under any conditions, which can never occur in practice.

In the construction shown in Fig. 4 the stationary portions B' B², &c., of varying diameter are located within an inner cylinder, gradually contracting toward the compressed air admission. It will be noted that in this construction, as well as that shown in Figs. 1 and 2, the perforations $b$ are disposed in alternate relation.

I claim as my invention—

1. In refrigerating apparatus operated by the compression, cooling and subsequent expansion of air or other elastic fluid, means for extracting the water therefrom comprising the casing B having an inclined bottom in combination with a horizontal series of alternately-perforated partitions B', B² dished to present a convexity in opposition to the fluid flow to withstand a considerable pressure, and arranged to receive the water and cause it to descend, by gravity to be separated from the air and flow along the inclined bottom, substantially as herein specified.

2. In refrigerating apparatus operated by the compression, cooling and subsequent expansion of air or other elastic fluid, means for extracting the water therefrom comprising the casing B with a series of perforated partitions B' B², in combination with a series of correspondingly-perforated partitions in close relation thereto, a shaft and means for turning the same for changing the position of some of the partitions, and a suitable water-discharge, substantially as herein specified.

3. In refrigerating apparatus operated by the compression, cooling and subsequent expansion of air or other elastic fluid, means for extracting the water therefrom comprising the casing B with a series of perforated partitions B', B², dished as shown, to withstand a considerable pressure, in combination with a series of correspondingly-perforated partitions D' D², and means as the shaft D and hand-wheel D⁵ for changing the position of some of the partitions so as to be partially out of coincidence with the perforations in the partitions B', B², and provisions for taking away the water thus separated, all substantially as herein specified.

4. In refrigerating apparatus operated by the compression, cooling and subsequent expansion of air or other elastic fluid, the casing B containing a series of perforated partitions B' B² in the path of the fluid adapted to intercept moisture and having apertures $b$ at their lower edges to be sealed by the trapped water, the casing B also having a delivery-passage F leading downward therefrom, all arranged for joint operation substantially as herein specified.

5. In a refrigerating apparatus operated by the compression, cooling and subsequent expansion of air or other elastic fluid, means for extracting the water therefrom comprising the casing B, with a series of adjustable partitions dished to present each a convexity in opposition to the flow of compressed fluid and having alternately-disposed perforations $b$, a delivery-passage F leading downward therefrom, and a trap in such passage having a float connected to a double piston horizontally arranged and working easily in a cylinder communicating at its mid-length with an escape-passage so as to operate at any pressure under perfectly-balanced conditions, all substantially as herein specified.

6. In refrigerating apparatus operated by the compression, cooling and subsequent expansion of air or other elastic fluid, the combination of means for extracting the water therefrom comprising the casing B, with a series of partitions arranged in the path of the fluid and having alternately-disposed adjustable perforations arranged in the path of the fluid and dished to present each a convexity in opposition to the flow of compressed fluid, a delivery-passage F leading downward from the casing B, a trap in such passage and a valved pipe leading from such trap to convey moisture to the compressor, all arranged for joint operation, substantially as herein specified.

7. The combination with a moisture-separator having a series of dished disks each presenting a convexity in opposition to the compressed-fluid flow, of a chamber having a valved water-outlet controlled by a horizontally-movable and counterbalanced valve, and a steam-jacket surrounding said chamber to maintain the temperature notwithstanding the cold produced by the expansion of the air in the discharged water, substantially as herein specified.

8. In refrigerating apparatus operated by the compression, cooling and subsequent expansion of air or other elastic fluid, the combination of means for extracting the water therefrom comprising the casing B, with a series of perforated partitions arranged in the path of the fluid, a delivery-passage F leading downward therefrom, and a trap in such passage, a pipe leading from the base of the trap to convey moisture to the compressor, a branch pipe leading thereto from a high point of the trap, the cocks R², R³, controlling each separately, and the cock R' restraining the flow through both, all arranged for joint operation substantially as herein specified.

9. In refrigerating apparatus operated by the compression, cooling and subsequent expansion of air or other elastic fluid, the combination of means for extracting the water therefrom comprising the casing B, with a series of perforated partitions arranged in the path of the fluid, a delivery-passage F leading downward therefrom, a trap in such passage, a pipe leading from the base of the trap to convey moisture to the compressor, a branch pipe leading thereto from a high point of the trap, cocks R', R², R³, and the jackets P and W, with connections for supplying steam thereto, combined and arranged substantially as shown and adapted to avoid risk of freezing the apparatus, all substantially as herein specified.

10. In an air-expansion refrigerating apparatus, a series of stationary and movable perforated partitions arranged in the path of the fluid and adapted to intercept dense particles therein, a shaft for adjusting the movable partitions and operating an indicating device showing the extent of such movement, substantially as herein specified.

In testimony that I claim the invention above set forth I affix my signature in presence of two witnesses.

GEORGE H. ABRAMS.

Witnesses:
J. B. CLAUTICE,
M. F. BOYLE.